United States Patent [19]
Cloeren

[11] Patent Number: 5,451,357
[45] Date of Patent: Sep. 19, 1995

[54] APPARATUS AND PROCESS FOR COMPOSITE EXTRUSION WITH WIDTH ADJUSTMENT

[75] Inventor: Peter F. Cloeren, Orange, Tex.

[73] Assignee: The Cloeren Company, Orange, Tex.

[21] Appl. No.: 112,107

[22] Filed: Aug. 26, 1993

[51] Int. Cl.⁶ .................... B29C 47/06; B29C 47/16
[52] U.S. Cl. .................... 264/173.16; 264/176.1;
    425/131.1; 425/133.5; 425/462; 425/381;
    425/465; 425/466
[58] Field of Search .................... 264/171, 176.1;
    425/131.1, 133.5, 462, 461, 466, 465, 381

[56] References Cited

U.S. PATENT DOCUMENTS

| | | | |
|---|---|---|---|
| 2,859,475 | 11/1958 | Tornberg | 425/466 |
| 2,982,995 | 5/1961 | Groleau | 425/466 |
| 3,018,515 | 1/1962 | Sneddon . | |
| 3,072,962 | 1/1963 | McDermott et al. | 425/465 |
| 3,583,032 | 6/1971 | Stafford | 425/133.5 |
| 3,684,422 | 8/1972 | Huesing | 425/461 |
| 3,860,383 | 1/1975 | Sirevicius | 425/461 |
| 4,057,385 | 11/1977 | Yazaki et al. . | |
| 4,272,312 | 6/1981 | Thompson | 425/133.5 |
| 4,283,168 | 8/1981 | Miller et al. | 425/465 |
| 4,348,346 | 9/1982 | Thompson . | |
| 4,533,510 | 8/1985 | Nissel . | |
| 4,659,302 | 4/1987 | Maejima . | |
| 4,731,004 | 3/1988 | Wenz, Jr. . | |
| 4,784,815 | 11/1988 | Cloeren et al. . | |
| 5,120,484 | 6/1992 | Cloeren . | |

FOREIGN PATENT DOCUMENTS 2114050  8/1983  United Kingdom .

*Primary Examiner*—Jeffery R. Thurlow
*Attorney, Agent, or Firm*—Timothy R. Kroboth

[57] ABSTRACT

An improved extrusion apparatus includes an adjustable deckle and a flow channel in the deckle that makes possible extrusion of a composite stream, and in particular a side-by-side composite stream.

Beneficially, an end plate of the apparatus includes an inwardly projecting portion disposed in precision sliding fit within the deckle channel. Also provided is a process for composite extrusion with width adjustment.

16 Claims, 6 Drawing Sheets

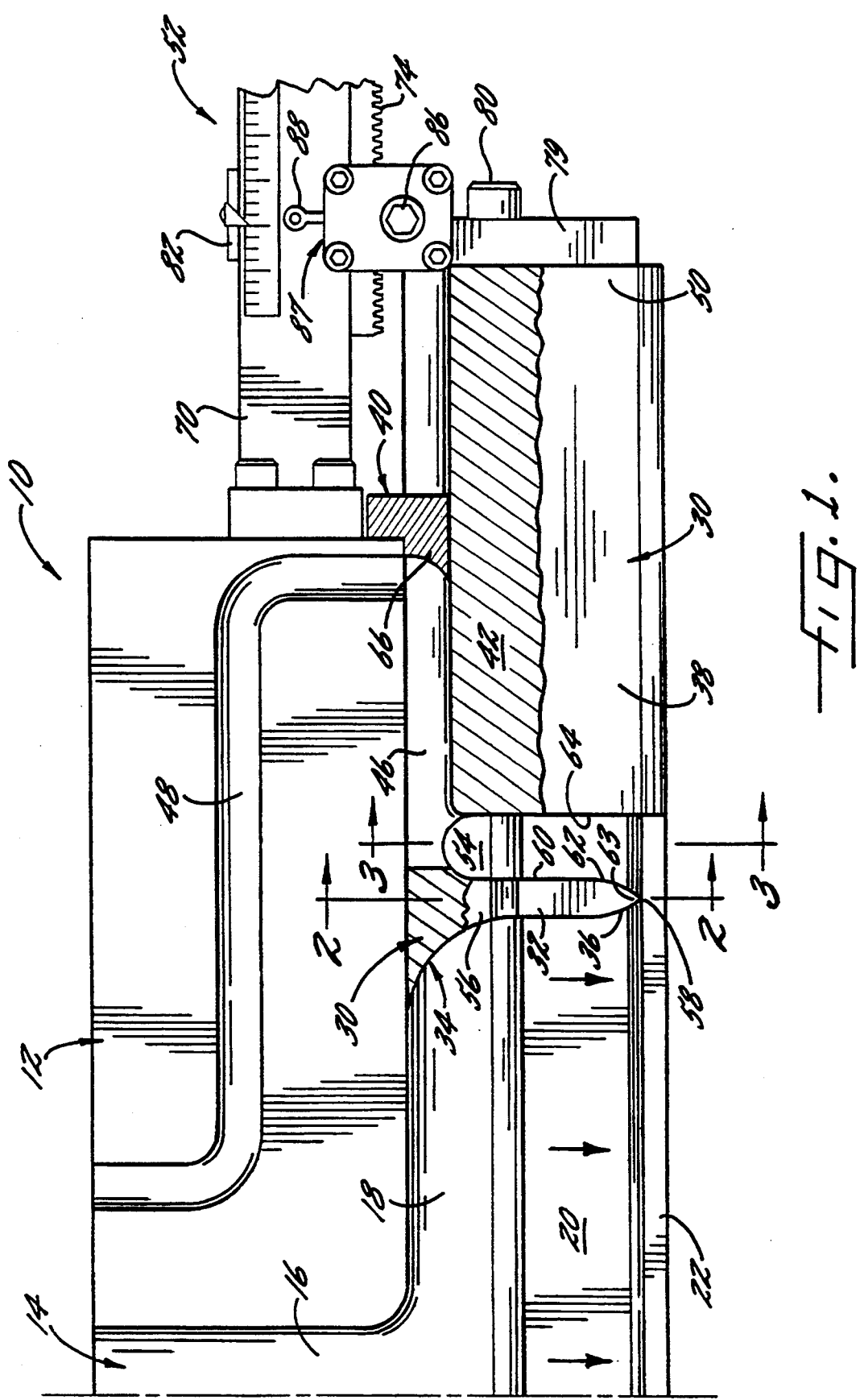

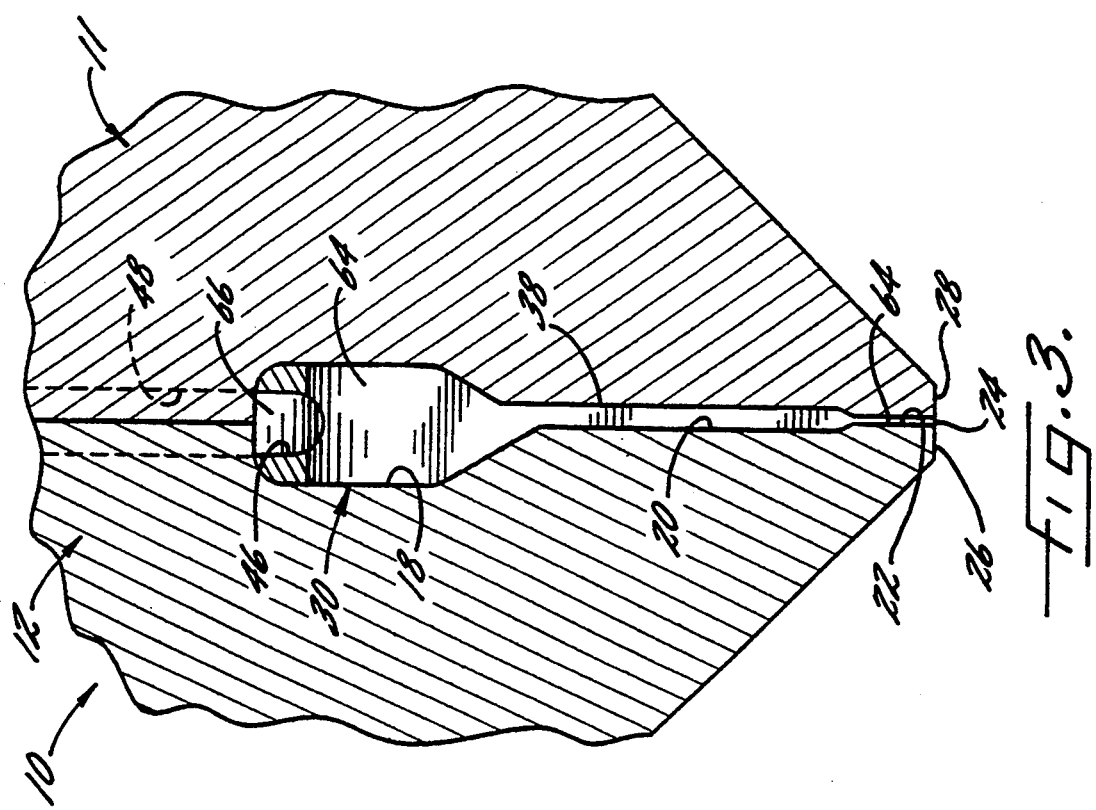
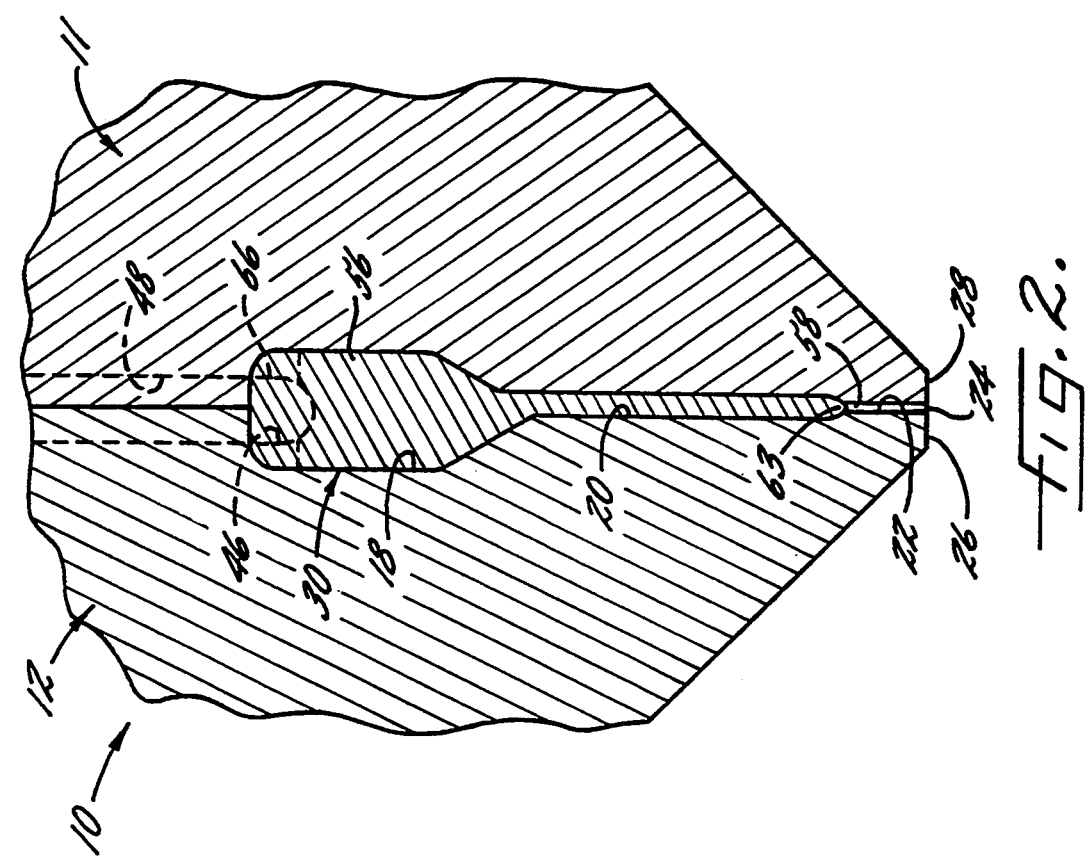

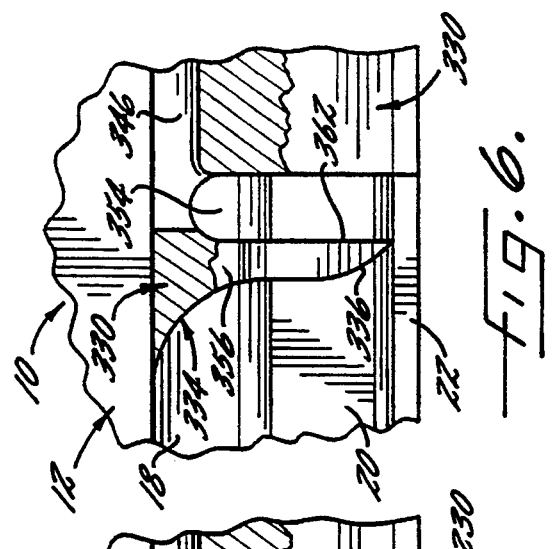
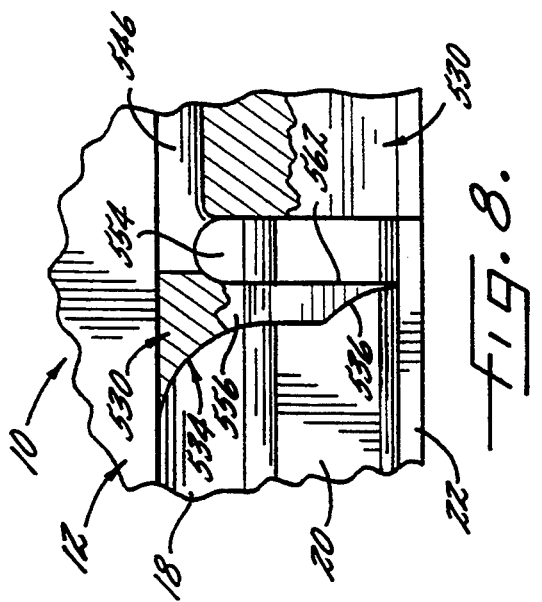
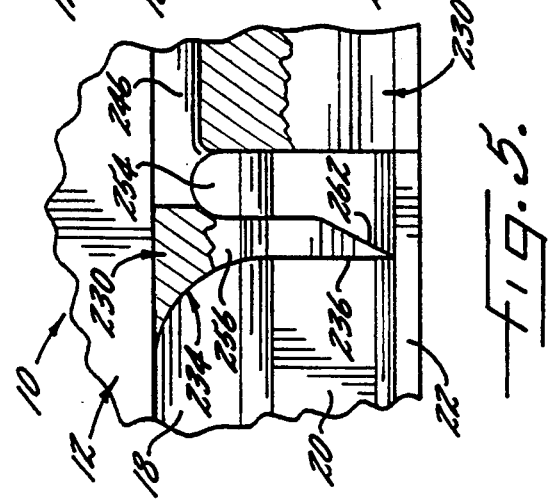
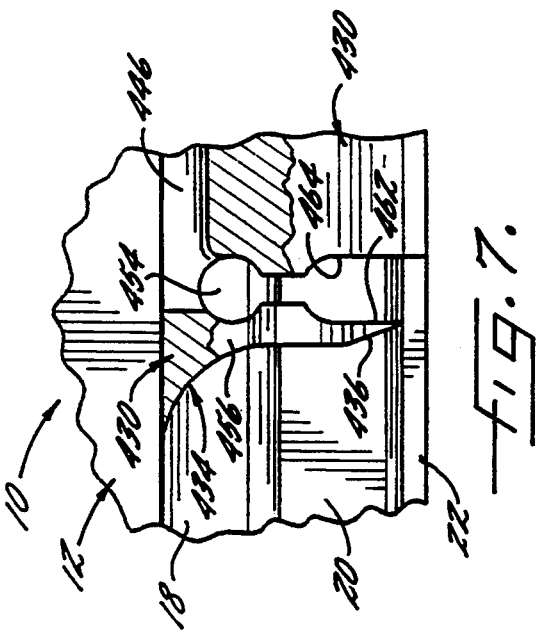
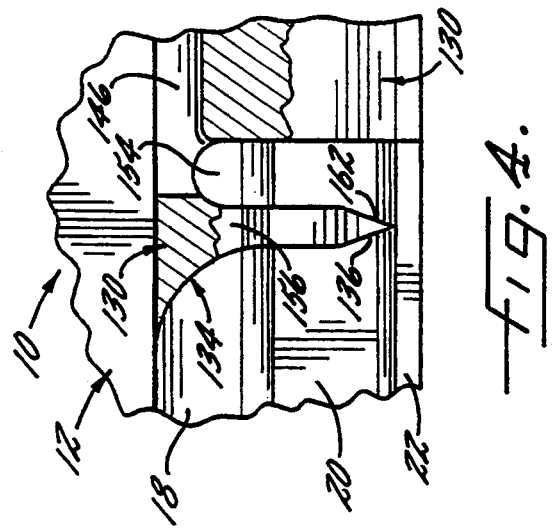

APPARATUS AND PROCESS FOR COMPOSITE EXTRUSION WITH WIDTH ADJUSTMENT

BACKGROUND OF THE INVENTION

This invention relates to composite extrusion, especially to side-by-side extrusion.

Forming a composite stream, in particular a side-by-side composite stream, is well known. Exemplary patents include U.S. Pat. Nos. 4,348,346 to Thompson, 4,533,510 to Nissel, 4,731,004 to Wenz, Jr., 4,784,815 to Cloeren and Wernery, Jr., and 5,120,484 to Cloeren. Mechanically dividing a manifold using an adjustable block, is illustrated by the Nissel patent.

Control of the degree of overlap or intermix along the joined edges of adjacent flow streams, and control of the position of the joined edges across the composite stream width have been described. Particularly described are the effect of the location selected for the convergence locus and the effect of the relative flow volumes on control of these properties.

An extrusion apparatus having deckles controlling stream flow within the apparatus and defining the exit slot width and hence product width, is well known. The deckles may be internal, external, or an external/internal combination. The deckles may be precise or snug fitting blockage devices termed "deckle plugs". Illustrative patents include U.S. Pat. Nos. 3,018,515 to Sneddon, 4,057,385 to Yazaki et al and 4,659,302 to Maejima et al, and UK Patent Application No. 2,114,050.

However, there remains a need for an improved extrusion apparatus capable of composite extrusion and product width adjustment.

SUMMARY OF THE INVENTION

It is accordingly an object of the present invention to provide an improved extrusion apparatus that provides for composite extrusion, in particular side-by-side extrusion.

It is a further object to provide an extrusion apparatus that also provides for product width adjustment.

It is an even further object to provide for product width adjustment, without affecting the degree of intermix along joined edges of laterally converged flow streams, or the width of a side stream in the product.

It is a still further object to provide for product width adjustment and side stream width adjustment.

Additional objects, advantages and novel features of the present invention are set forth in the description that follows, and in part will become apparent to those skilled in the art upon examination of the following description or may be learned by practice of the invention. The objects and advantages of the invention may be realized and attained by means of instrumentalities and combinations particularly pointed out in the appended claims.

To achieve the foregoing objects and in accordance with the purpose of the present invention, as embodied and broadly described herein, there is provided an extrusion apparatus comprising a main body including a first flow passageway, and a deckle adjustably disposed in the passageway. Beneficially, a face of the deckle mechanically forms a movably disposed end of the first flow passageway, and a channel in the deckle provides a second flow passageway. Fluid communication of the flow passageways provides for the formation of a composite stream.

Conveniently, the main body may include a feed inlet channel in fluid communication with the deckle channel. Advantageously, the deckle may include a divider portion disposed between the flow passageways. An end plate of the apparatus beneficially may include an inwardly projecting portion disposed in precision sliding fit within the deckle channel to provide for directed, streamlined flow.

Preferably, the deckle includes a full width portion that extends through an end of the apparatus, and that is provided with the flow channel. Preferably, the full width portion is disposed at least partially within a transverse flow-providing manifold of the first flow passageway.

Also provided is a novel process for extruding a composite stream. By the process, a first flow stream is passed through a first passageway, a second flow stream is passed through a passageway in an adjustable deckle disposed in the first passageway, and faces of the flow streams are joined to form a composite stream. Beneficially, the composite stream width may be changed by adjustment of the extent of the deckle, without affecting the degree of intermix along the joined edges of laterally converged streams, or the width of the second stream in the composite. Thus, the position of the joined edges across the composite stream width may be advantageously unaffected.

In an appropriate application such as to mechanically provide for width control of the second flow stream of the laminate, a second flow passageway may be formed by cooperation of a channel in a first deckle member, and an end of a second deckle member adjustably disposed downstream thereof in the first passageway. In this case, a face of the first deckle member mechanically forms a movably disposed end of the first flow passageway, and a face of the separately adjustable, second deckle member mechanically forms a movably disposed end of the composite flow passageway.

As a result, the first flow passageway width may be maintained constant while the second stream width and product width may be mechanically changed by adjustment of the extent of the second deckle member. Alternatively, the first stream width and the second stream width may be inversely changed relative to one another, by adjustment of the extent of the first deckle member, while the product width is maintained constant.

In the drawing and detailed description of the invention that follow, there are shown and essentially described only preferred embodiments of this invention, simply by way of illustration of the best mode contemplated of carrying out this invention. As will be realized, this invention is capable of other and different embodiments, and its several details are capable of modification in various respects, all without departing from the invention. Accordingly, the drawing and the detailed description are to be regarded as illustrative in nature, and not as restrictive.

BRIEF DESCRIPTION OF THE DRAWING

Reference is now made to the accompanying drawing, which forms a part of the specification of the present invention.

FIG. 1 is a view of a preferred embodiment of a right hand side of an extrusion apparatus in accordance with the present invention;

FIGS. 2 and 3 are enlarged, cross-sectional views taken substantially along lines 2—2 and 3—3 of FIG. 1, and including the upper die body;

FIGS. 4–8 are partial views similar to FIG. 1, illustrating alternative flow-contacting faces of the deckle;

DETAILED DESCRIPTION OF THE INVENTION

Figure 9:
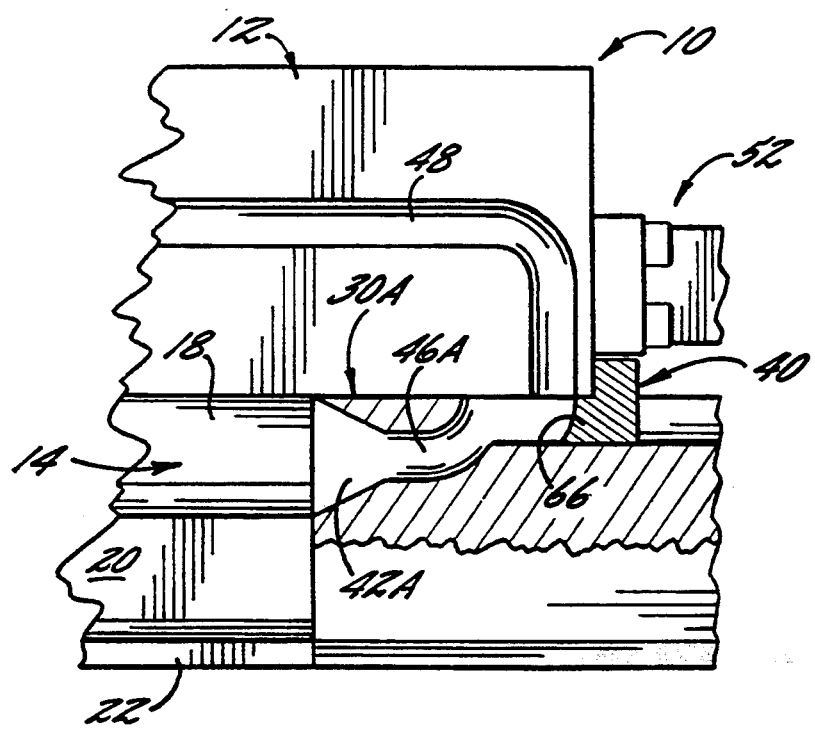
FIGS. 9 and 10 are partial views similar to FIG. 1, illustrating deckles that lack a divider portion.

The present invention is directed to a novel extrusion apparatus beneficially providing for side-by-side extrusion for the production of sheet and film product, particularly edge-laminated, polymeric product. Advantageously, the apparatus includes an adjustable deckle for control of the product width. In one embodiment, product width may be changed by adjustment of the deckle, without affecting the degree of intermix along the joined edges of laterally converged flow streams, and without affecting the relative position of joined faces of a composite. In another embodiment, product width may be changed by adjustment of the deckle, and side stream width may also be mechanically changed.

Although reference is made in this description to polymeric materials especially thermoplastic materials such as synthetic resins, it will be appreciated that the invention has applicability to a variety of flowable materials. Also, although the description refers to forming a laterally disposed composite stream, it will be appreciated that prior to convergence, a stream may already comprise a multilayer structure.

Referring to FIG. 1, a right hand side of a preferred embodiment of an extrusion apparatus 10 in accordance with the present invention is shown, with the midline of the apparatus indicated by a dashed line. It will be understood that the opposite side of apparatus 10 may be a mirror image of that shown.

With reference also to FIGS. 2 and 3, extrusion apparatus 10 includes a main body formed by body portions 11,12 and having a flow passageway 14, which provides for a main direction of flow indicated by arrows. The flow passageway includes in downstream order, a feed channel 16, a transverse flow-providing manifold 18 by which a flow stream is spread widthwise, a channel portion 20 commonly termed a preland channel, and a land channel 22 that extends to an exit orifice 24 suitably in the form of a slot formed by lips 26,28.

Conveniently, with particular reference to FIGS. 2 and 3, the manifold has a generally non-circular, and in particular a generally rectangular, cross-section, and may be of substantially constant cross-sectional area from end to end. Alternatively, the manifold cross-section may be for instance, generally circular or tear drop shaped.

Referring particularly to FIG. 1, adjustably disposed within flow passageway 14 is a deckle 30. Beneficially, the deckle has a end portion 32 with a flow-contacting face 34 that mechanically forms a movably disposed end of at least manifold 18 of flow passageway 14. Face 34 includes an upper, concavely radiused face, and a downstream, convexly radiused face 36. The adjustable deckle is illustrated as partially extended within the flow passageway.

Advantageously, with particular reference again to FIGS. 2 and 3, deckle 30 is disposed in precision or snug fit within flow passageway 14 so as to serve as a flow blockage member or "plug". More particularly, the deckle is in precision sliding fit relationship with manifold 18, and may include a portion 38 that may extend to the exit orifice and that is likewise in precision sliding fit relationship with the flow passageway downstream of the manifold. Accordingly, the deckle may be beneficially provided with a shape that conforms to the surrounding flow passageway. The fit of deckle 30 is advantageously such that complete end closure of manifold 18 and channel 20 of flow passageway 14, except for necessary mechanical clearance, results.

As may be understood, only portions of deckle 30 adjacent to flowing liquid, need a conforming shape to minimize or eliminate polymeric leakage. Also, the conforming shape will vary with the shape of the surrounding flow passageway. Thus, a deckle portion within a generally non-circular manifold will be generally non-circular in cross-section; whereas, a deckle portion within a generally circular manifold will be generally circular in cross-section.

Beneficially, the deckle includes a full width portion. By "full width" is meant, for purposes of this description, having a transverse dimension substantially equal to or exceeding the maximum engagement of the particular member in the particular flow passageway. Generally speaking, and not by limitation, a maximum engagement length of a deckle disposed within a manifold will be about 25% of the manifold width. Accordingly, when retracted, a full width portion is not disposed in its entirety within the particular flow passageway, but rather extends through an end of the extrusion apparatus. Reference is hereby made to U.S. patent application Ser. No. 915,485, filed on Jul. 17, 1992, which is directed to novel extrusion apparatus including full width deckles.

Referring to FIGS. 1 to 3, deckle 30 advantageously includes a full width portion 42 disposed within the manifold, and a channel 46 in full width portion 42 provides a passageway for a separate flow stream. Conveniently, a feed inlet channel 48 in the main body of the apparatus is in fluid communication with flow channel 46. Suitably, channel 46 is generally transversely disposed and may extend to an end 50 of the deckle, which is operatively connected to an adjustment mechanism 52. As illustrated, a portion of the wall of manifold 18 may cooperate with a U-shaped recess in a deckle to form flow channel 46.

Beneficially, an end plate 40 includes an advantageously concavely radiused, inwardly projecting portion 66 disposed in precision sliding fit within channel 46 to provide for directed, streamlined flow. The sliding fit permits the extent of the flow channel within main body 12 to be adjusted as necessary.

Advantageously, generally transverse channel 46 communicates with a channel portion 54 in end 32 of the deckle so as to comprise a second flow passageway. In this case, deckle 30 includes a divider portion 56 disposed between the flow passageways and that provides for flow passageway convergence at a suitable locus 58. As may be understood from FIG. 2, divider 56 is beneficially in precision sliding fit within flow passageway 14 and hence a plug. As earlier indicated, flow-contacting face 34 of divider 56 mechanically forms a movably disposed end of flow passageway 14.

Suitably, divider 56 includes a second flow-contacting face formed by a linear face 60 and a downstream convexly radiused face 62; and faces 60,62 cooperate with a third flow-contacting face 64 of deckle 30 to define the width of channel portion 54. As can be understood from FIG. 1, channel portion 54 is further defined by wall portions of flow passageway 14. As indicated, channel portion 54 may include a transverse flow-providing section and a channel portion similar to channel portion 20.

Conveniently, radiused faces 36,62 of the divider terminate to form a tip 63, which is suitably disposed in channel portion 20. Downstream of tip 63, flow stream convergence occurs at locus 58 to provide for side-by-side, melt lamination.

Face 64 of deckle portion 38 may extend to the exit slot. In such case, face 64 defines an end of the exit slot, and in combination with a like face at an opposite end of apparatus 10, defines the exit slot width and hence the product width. As illustrated, face 64 may be linear and generally perpendicular to the exit slot.

As illustrated in FIGS. 4–8, the flow-contacting faces of the divider-portion of the deckle may have a variety of shapes. In these Figures, like parts are designated with like numbers with respect to FIG. 1. Thus, a downstream face may, for example, be linear (faces 136,162, FIG. 4; face 262, FIG. 5; face 436, FIG. 7), a rectilinear continuation of an upstream face (faces 236, 362 and 562 of FIGS. 5, 6 and 8), or concavely radiused (face 536, FIG. 8). As also exemplified, a flow-contacting face of deckle portion 38 may have different shapes. For instance, with reference to FIG. 7, an irregularly-shaped face 464 may cooperate with the opposing divider faces to provide a key-hole shape.

The flow passageways may advantageously converge, as shown in FIG. 1, upstream of and proximate to the exit orifice. Reference is hereby made to U.S. Pat. No. 5,120,484 to Cloeren, previously cited, in which meaning of the term "proximate" and benefits of proximate convergence are discussed. Accordingly, it will be understood that "proximate" means from ⅛ to about 3" upstream of the exit orifice, but most typically about 1 to 2 inches upstream.

However, selection of a convergence location may be driven by desire for overlap or intermix or blending at the joined edges or faces. Generally speaking, the closer a convergence locus is to the exit orifice, the sharper the seam definition; whereas, the further the locus is from the exit orifice, the less defined the seam becomes. In an appropriate application, convergence may be at or near the entry to channel portion 20.

The width of a side stream in a laterally converged composite may be mechanically determined by the distance between divider tip 63 and flow-contacting face 64. However, the width may be altered by flow volume control, as a result of which the width of each joined stream within a given product width may be varied. For example, if flow passageway 14 has greater flow volume per unit width than the second flow passageway, then the side stream width in the composite will be reduced. As understood by one skilled in the art, the relative flow volumes through the passageways is related to the output of the respective extruders and flow restriction.

Figure 10:
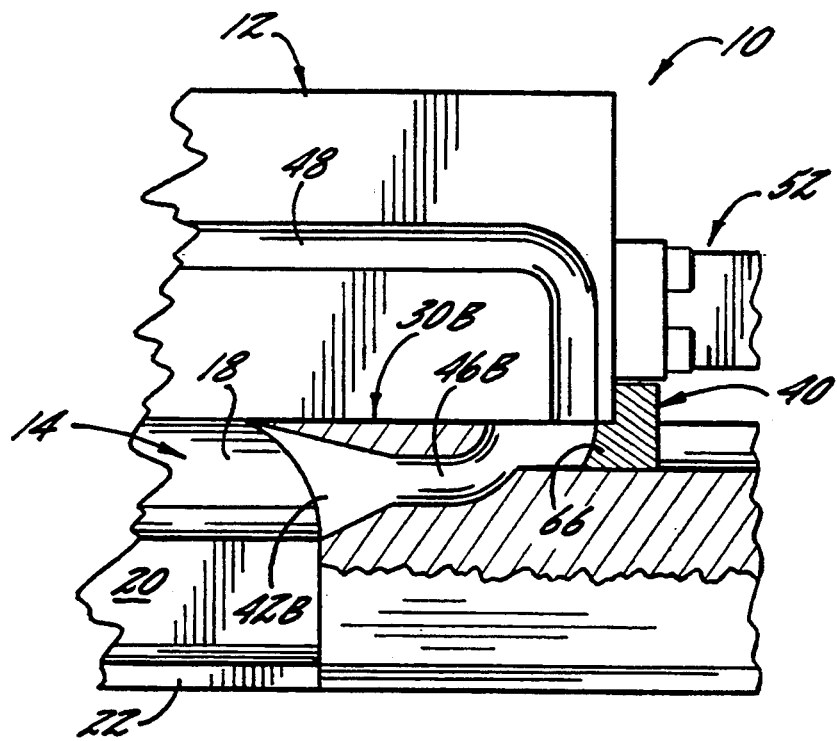

As exemplified in FIGS. 9 and 10, the deckle channel (channels 46A, 46B) may comprise the second flow passageway. In this case, the deckle channel may open into manifold 18, with convergence of flow streams within the manifold. Side stream width is controlled by the relative flow volumes in this modification. Accordingly, the deckle may lack a divider portion disposed between flow passageways. The apparatus of these Figures otherwise correspond to apparatus 10 as indicated by the use of corresponding numbers to designate like parts. For sake of brevity therefore, details previously described are not repeated.

Figure 11:
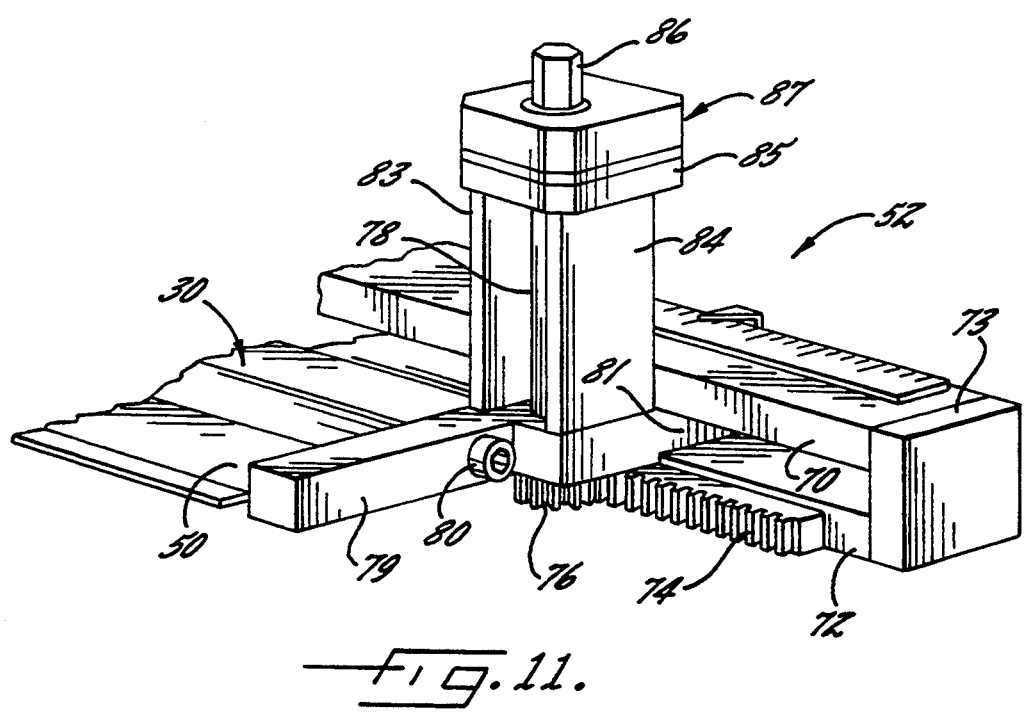
FIG. 11 is a partial perspective view showing further details of the deckle adjustment mechanism of the apparatus of FIG. 1.

With reference to FIGS. 1 and 11, in supporting connection with deckle 30 is an advantageous adjustment mechanism 52 for mechanically moving the deckle generally parallel to the exit slot and adjusting the extent of the deckle and of flow channel 46 within flow passageway 14. The adjustment mechanism includes a generally horizontal, support arm beneficially formed by generally parallel, spaced apart bars 70,72 each rigidly secured to main body 12 at one end, and connected at the other end by a member 73.

Secured to an underside of bar 72 of the support arm is a toothed rack 74 in engagement with a pinion 76 provided on an end of a rotatable shaft 78 indirectly supported by the support arm. Directly supported by the arm is an assembly arm 79 oriented generally perpendicular to the support arm and secured to end 50 of the deckle by a bolt 80. An upper portion 81 of the assembly arm is provided with a notched area to fit around bar 72 of the support arm so that an outwardly projecting portion 82 of the upper assembly arm rides on and along an upper surface of the support arm. In this way, the assembly arm is supported by and movable along the support arm, with sliding movement of the assembly arm toward or away from main body 12 and movement of deckle 30 and flow channel 46 being effected by rotation of the pinion in the corresponding direction.

Attached to a face of the assembly arm are spaced apart bars 83,84, connected by a member 85. Rotatable shaft 78 is disposed between these spaced apart bars, and at the pinion end extends through an aperture in the assembly arm, and at an opposite end extends through an aperture in connecting member 85 and terminates in a hex head 86 for rotation of the pinion by suitable means such as a wrench. Advantageously fitted over the end of the shaft extending through connecting member 85 is a conveniently conventional ratchet clutch 87, which includes a lever 88 for effecting pawl/gear engagement/disengagement. Reference is made to U.S. patent application Ser. No. 967,142, filed on Oct. 27, 1992, which describes an adjustment mechanism similar to mechanism 52.

Figure 12:
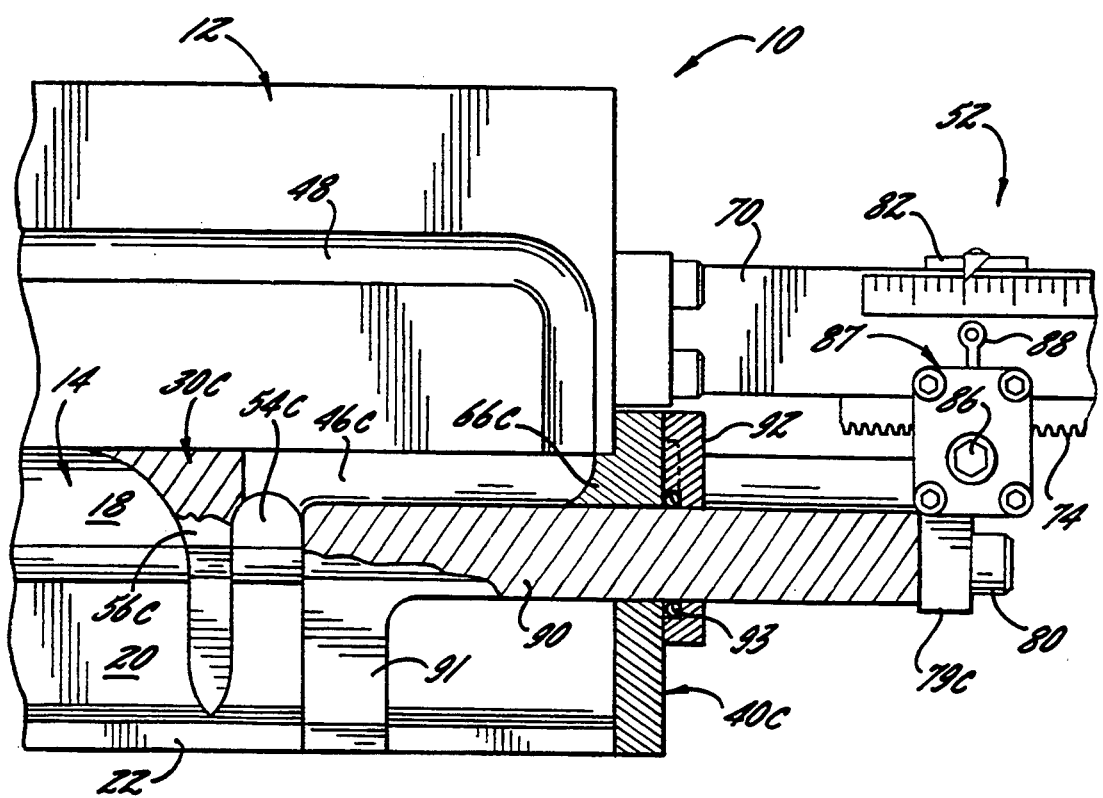
FIGS. 12–14 are partial views similar to FIG. 1, illustrating deckle assemblies having a full width, upper portion or member.
Figure 13:
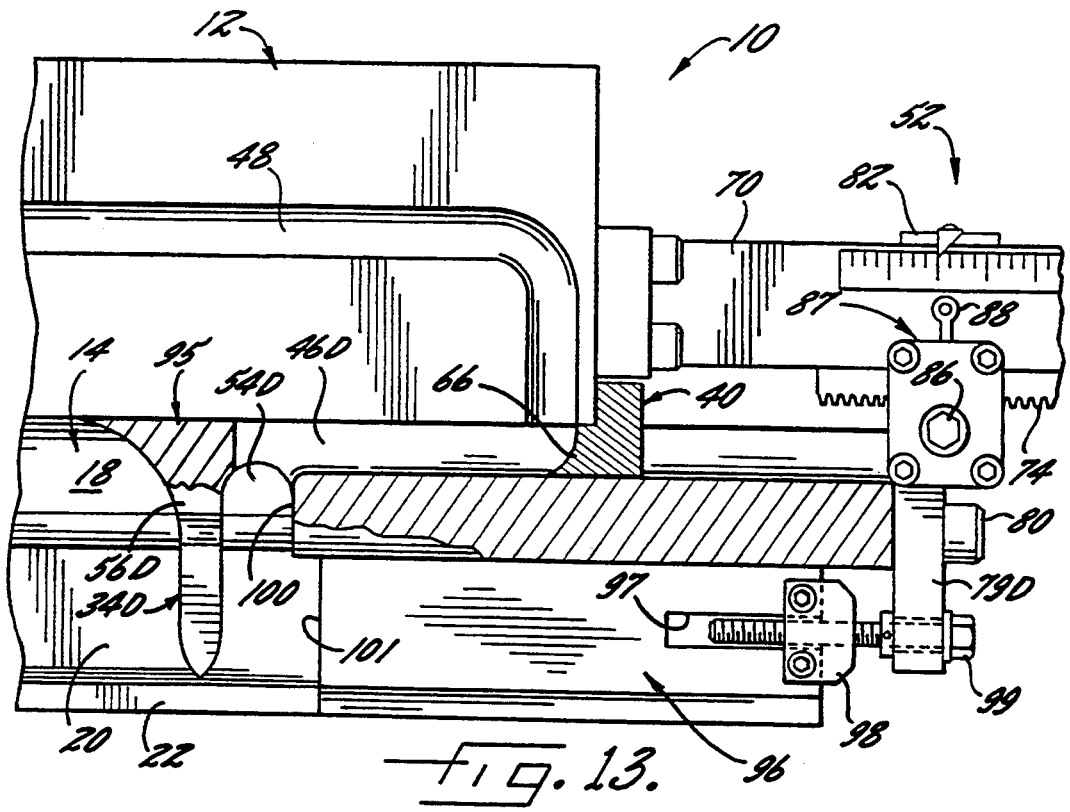
Figure 14:
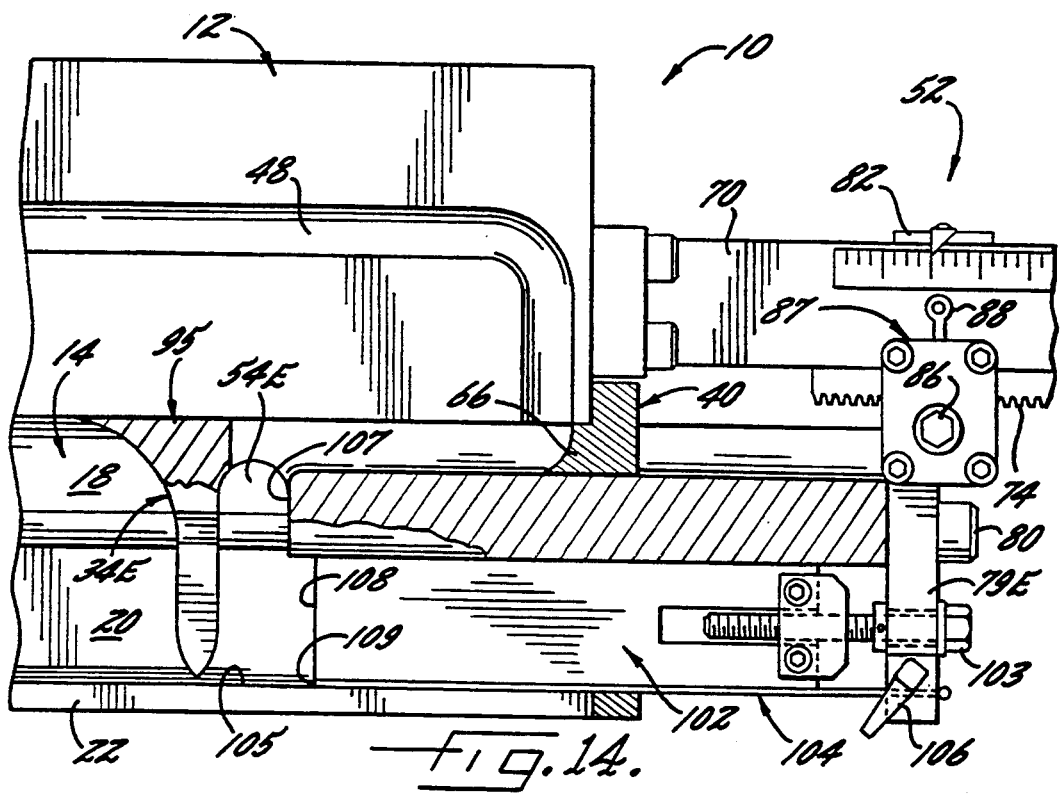

FIGS. 12–14 illustrate other useful deckles. The apparatus of these Figures correspond in many respects to apparatus 10 as indicated by the use of corresponding numbers to designate like parts. For sake of brevity therefore, details previously described are not repeated.

As illustrated in FIG. 12, it is sufficient for only an upper portion 90 of a deckle to be full width and to be within the manifold. In this case, the deckle may include an integral fin 91, which may beneficially extend to the exit slot thereby defining the exit slot width. To prevent leakage through end plate 40C around the full width portion of the deckle, a retainer member 92 and a sealing gasket 93 that cold forms under compression, are beneficially employed. Leakage-preventing members are omitted for simplification from the other Figures.

As illustrated in the highly preferred embodiments of FIGS. 13 and 14, a deckle assembly may be used that includes a full width, upstream member 95 disposed beneficially within the manifold and including a flow channel 46D, and a separately adjustable, downstream member or members. Upstream member 95 advantageously includes a divider 56D having a face 34D that mechanically controls the width of at least manifold 18 of flow passageway 14. The upstream member including divider 56D, which suitably terminates in channel portion 20, is beneficially in precision sliding fit within the flow passageway and hence a plug. Separate adjustability of a downstream member advantageously permits mechanical width control of a side stream, and adjustment of the composite width, as earlier described.

Beneficially, the deckle assembly components are located closely adjacent to, or in sliding fit contact with, one another. The additional deckle members may advantageously be plugs and be full width, and extend to the exit slot.

Referring particularly to FIG. 13, a full width, downstream deckle member 96 may be provided with a notch 97 in its outer end, and may have secured to the outer end, a member 98 having a threaded bore in alignment with the notch. A rotatable adjustment bolt 99 captured by the assembly arm, engages the threaded bore of member 98, for independent adjustability of deckle member 96.

The width of channel portion 54D is defined in part by a flow-contacting face provided by ends 100,101 of deckle members 95,96, respectively. This flow-contacting face may be provided with a variety of suitable contours as well known in the art with respect to face 34D of the divider.

Face 101 of deckle member 96, which advantageously is a plug and extends to the exit slot, defines the exit slot width and thus the composite width. As indicated, face 101 of deckle member 96 and face 34D of the divider of deckle member 95 are beneficially movable independently of each other.

Referring to FIG. 14, a full width, downstream deckle member 102 similar to deckle member 96 except with respect to length, is independently adjustable, with adjustability being provided by a rotatable adjustment bolt 103. Downstream of deckle member 102 is a deckle rod 104, which is advantageously disposed proximate to a transition wall 105 separating the preland and land channels. Independent adjustability of the deckle rod may be provided by a tightening mechanism 106, which makes frictional contact with a portion of the rod passing through the assembly arm.

Channel portion 54E includes a flow-contacting face provided by ends 107,108,109 of deckle members 95,102,104, respectively. This face may, like the face provided in FIG. 13 by deckle ends 95,96, be provided with a variety of suitable contours. As will be understood by one skilled in the art, end 109 of the deckle rod mechanically defines the exit slot width. Ends 108,109 are movable independently of each other and of a flow-contacting face 34E of the divider of deckle member 95.

Having described the invention in detail and by reference to preferred embodiments thereof, it will be apparent that modifications are possible without departing from the scope of the invention defined in the appended claims. Several modifications have been briefly mentioned for purposes of illustration.

I claim:

1. An extrusion apparatus comprising a first flow passageway; a slidably disposed deckle comprising a plug portion extending into said first flow passageway, said plug portion comprising a channel portion; and a second flow passageway comprising said channel portion and an inlet channel for said channel portion, and converging with said first flow passageway.

2. The extrusion apparatus of claim 1, wherein said deckle comprises a divider portion disposed between said first flow passageway and said channel portion.

3. The extrusion apparatus of claim 1, wherein said plug portion extends through an end of said extrusion apparatus into said first flow passageway.

4. The extrusion apparatus of claim 1, wherein said channel portion comprises a recess that extends exterior to a main body of said apparatus.

5. The extrusion apparatus of claim 4, wherein said recess is generally transversely disposed and is located in an upper portion of said plug portion.

6. The extrusion apparatus of claim 1, comprising a stationary member comprising an inwardly projecting portion disposed in precision sliding fit within said channel portion, which is movable with respect to said stationary member.

7. The extrusion apparatus of claim 1, wherein said plug portion extends through an end of said extrusion apparatus, and wherein said channel portion comprises a generally transversely disposed recess that extends through said end of said extrusion apparatus, and that is located in an upper portion of said plug portion; and comprising a stationary member comprising an inwardly projecting portion disposed in precision sliding fit within said recess, which is movable with respect to said stationary member.

8. The extrusion apparatus of claim 1, wherein said plug portion is disposed at least partially within a transverse flow-providing manifold of said first flow passageway.

9. An extrusion apparatus comprising a first flow passageway; a slidably disposed, first deckle member comprising a plug portion extending into said first flow passageway, said plug portion comprising a channel portion; and a second flow passageway formed by cooperation of said channel portion and an end of an independently adjustable, second deckle member disposed downstream of said plug portion of said first deckle member; said second flow passageway converging with said first flow passageway.

10. The extrusion apparatus of claim 9, wherein said first deckle member comprises a divider portion disposed between said first flow passageway and said second flow passageway.

11. The extrusion apparatus of claim 9, comprising a stationary member comprising an inwardly projecting portion disposed in precision sliding fit within said channel portion, which is movable with respect to said stationary member.

12. The extrusion apparatus of claim 9, wherein said plug portion extends through an end of said extrusion apparatus, and wherein said channel portion comprises a generally transversely disposed recess that extends through said end of said extrusion apparatus, and that is located in an upper portion of said plug portion; and comprising a stationary member comprising an inwardly projecting portion disposed in precision sliding fit within said recess, which is movable with respect to said stationary member.

13. A process for coextruding a composite stream comprising passing a first flow stream through a first passageway into which a plug portion of a slidably disposed deckle extends; passing a second flow stream through a second passageway comprising an inlet channel and a channel portion in said plug portion of said deckle; and converging said first flow stream and said second flow stream to form a side-by-side composite stream.

14. A process for coextruding a composite stream comprising passing a first flow stream through a first passageway into which a plug portion of a slidably disposed, first deckle member extends; passing a second flow stream through a second passageway formed by cooperation of a channel portion in said plug portion of said first deckle member, and an end of an independently adjustable, second deckle member disposed downstream of said plug portion; and converging the flow streams to form a side-by-side composite stream.

15. The process of claim 14, comprising adjusting the extent of said first deckle member in said first flow passageway.

16. The process of claim 14, comprising adjusting the extent of said second deckle member.

* * * * *